3,011,712
DIGITAL COMPUTING ENGINES
Kenneth V. Diprose, Addlington, near Macclesfield, and Geoffrey C. Rowley, Cheam, England, assignors to A. V. Roe & Co. Limited, Greengate, Middleton, Manchester, England
Filed June 5, 1959, Ser. No. 818,382
Claims priority, application Great Britain June 5, 1958
3 Claims. (Cl. 235—176)

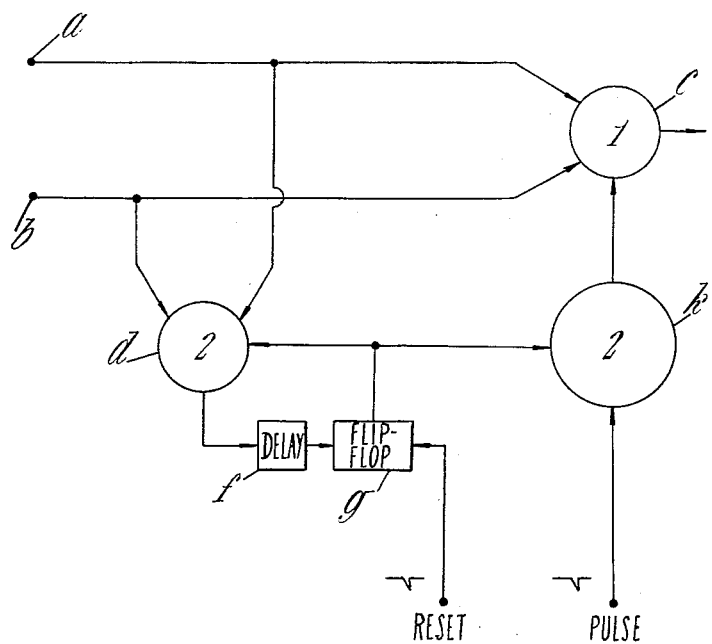
Inventors
K.V. Diprose
G.C. Rowley
By Glascock Downing Neebler
Attys.

In the class of digital computing engines known as digital differential analysers, mathematical quantities are represented by trains of impulses, the rate of arrival of these impulses at a given point in the machine being a measure of the quantity concerned. It is frequently necessary to sum these trains of impulses and this may be achieved in various ways.

An object of the present invention is to provide an improved means for summing pulse rates in a simple manner using a small amount of apparatus and power.

The invention consists in a computing engine comprising an AND-gate and an OR-gate connected across two inputs, the summed output being taken from the OR-gate and the output of the AND-gate, after delay, being applied to a binary storage device which in the set state opens a second AND-gate to which a clock or like pulse is applied so that an output occurs when this gate is open, this output being fed to the OR-gate to provide a pulse at the summed output and the storage device being reset.

To sum three pulse trains the summed output of one circuit is connected to one of the inputs of a second such circuit, the third pulse train being connected to the other input of this second circuit. In this manner $n$ pulse trains may be summed using $n-1$ circuits in accordance with the invention.

The accompanying drawing shows by way of an example only a logical diagram of an embodiment of the invention in which the two pulse trains to be added are applied to inputs $a$ and $b$. The nature of this class of computing engine requires that at any point, a continuous train of pulses represents the maximum value of any given mathematical quantity. It follows therefore that the sum of the rates of the inputs to lines $a$ and $b$ may not exceed the maximum rate of pulses in the machine. Inputs $a$ and $b$ are connected to an AND-gate $d$ and to an OR-gate $c$. A pulse on either $a$ or $b$ inputs causes an output pulse from $c$. If pulses arrive simultaneously on lines $a$ and $b$, then an output is obtained from the OR-gate $c$ and also from the AND-gate $d$. This latter output passes through a delay $f$ and sets a flip-flop $g$. The delay is arranged such that the flip-flop $g$ is set after the duration of the impulses applied to inputs $a$ and $b$. At the time when the next pulses may arrive on these inputs, a clock or like pulse is applied to the AND-gate $k$ which is opened thereby if the flip-flop $g$ has been set. A pulse therefore occurs on the output of the OR-gate $c$ due to the setting of the flip-flop, and providing that no impulses arrive on inputs $a$ and $b$, the device reverts to its dormant state upon the application of a re-set pulse to the flip-flop $g$. Thus the two impulses first applied to the inputs $a$ and $b$ have been represented by two impulses in time sequence at the output of the OR-gate $c$.

Consider now the operation of the circuit if a pair of impulses arrive simultaneously at inputs $a$ and $b$ and at the next interval of time an impulse arrives on either input $a$ or $b$. The circuit operates as described above except that in addition to the output of the OR-gate $c$ due to the setting of flip-flop $g$, the AND-gate $d$ opens again due to the inputs from the flip-flop $g$ and either $a$ or $b$. The flip-flop $g$ is therefore set again after being reset as described above. Thus, in the next time interval, a third pulse is emitted from the OR-gate $c$ and the three pulses which have been applied to inputs $a$ and $b$ over two successive intervals of time appear at the output of the OR-gate $c$ in three successive intervals of time. Thus, pulse rate addition has been obtained. Due to the limitation on the rates of arrival of pulses on inputs $a$ and $b$ mentioned above, pulses may not occur on both inputs $a$ and $b$ in consecutive time intervals and this case is not required to be met by the circuit.

If it is required to sum three pulse trains to form a single output, the output from the OR-gate $c$ may be taken to an input of a similar device and the third pulse train be applied to the other input, providing the limitation that the sum of the input rates does not exceed the maximum machine rate is observed.

This principle may be extended to sum as many pulse trains as required.

We claim:
1. A pulse rate adder comprising an OR gate having three inputs and an output, a gating circuit having three inputs and an output for producing an output pulse when at least two of its inputs are enabled, a first and second pulse input source respectively coupled to two inputs of the OR gate and respectively coupled to two inputs of the gating circuit, a delay means connected to the output of the gating circuit, the output of the delay means being coupled to the third input of the gating circuit, a clock pulse source, an AND gate enabled by the clock pulse source and the output of the delay means, and means for applying the output of the AND gate to the third input of the OR gate, whereby the number of output pulses emanating from the OR gate is indicative of the sum of the pulse rates at the first and second pulse input source.

2. A pulse rate adder in accordance with claim 1, in which the delay means includes a delay circuit having its input connected to the output of the gating circuit and its output connected to a storage device, the output of which is connected to the gating means and AND gate.

3. A pulse rate adder in accordance with claim 2, in which the storage device comprises a bi-stable multivibrator triggered by the output of the delay means and a source of pulses for resetting the multivibrator.

References Cited in the file of this patent
UNITED STATES PATENTS

| | | |
|---|---|---|
| 2,987,253 | Schreiner et al. | June 6, 1951 |
| 2,643,820 | Williams et al. | June 30, 1953 |
| 2,686,632 | Wilkinson | Aug. 17, 1954 |
| 2,693,907 | Tootill | Nov. 9, 1954 |
| 2,812,903 | Knutsen | Nov. 12, 1957 |
| 2,851,219 | Hussey | Sept. 8, 1958 |